(12) United States Patent
Fong

(10) Patent No.: US 8,272,239 B2
(45) Date of Patent: Sep. 25, 2012

(54) ANTI-THEFT LOCKING DEVICE FOR A VEHICLE STEERING WHEEL

(76) Inventor: Jian-Jhong Fong, Changhua (TW)

( * ) Notice: Subject to any disclaimer, the term of this patent is extended or adjusted under 35 U.S.C. 154(b) by 158 days.

(21) Appl. No.: 12/867,525

(22) PCT Filed: Feb. 14, 2008

(86) PCT No.: PCT/CN2008/070301
§ 371 (c)(1),
(2), (4) Date: Aug. 13, 2010

(87) PCT Pub. No.: WO2009/100620
PCT Pub. Date: Aug. 20, 2009

(65) Prior Publication Data
US 2010/0313613 A1 Dec. 16, 2010

(51) Int. Cl.
*B60R 25/02* (2006.01)
(52) U.S. Cl. ............ 70/185; 70/186; 70/252; 70/256
(58) Field of Classification Search ............ 70/182–186, 70/247, 252, 256
See application file for complete search history.

(56) References Cited

U.S. PATENT DOCUMENTS

| | | | | |
|---|---|---|---|---|
| 3,703,092 A * | 11/1972 | Elliott | | 70/248 |
| 4,596,303 A * | 6/1986 | Tremblay | | 180/287 |
| 5,454,238 A * | 10/1995 | Ross et al. | | 70/186 |
| 5,595,079 A * | 1/1997 | Myers | | 70/233 |
| 5,896,765 A * | 4/1999 | Peyre et al. | | 70/186 |
| 6,439,014 B1 * | 8/2002 | Syamoto | | 70/247 |
| 6,776,251 B2 * | 8/2004 | Landmann | | 180/287 |
| 7,921,684 B2 * | 4/2011 | Okuno et al. | | 70/186 |
| 8,099,986 B2 * | 1/2012 | Takeuchi et al. | | 70/186 |
| 2001/0025516 A1* | 10/2001 | Starken | | 70/186 |
| 2004/0069025 A1* | 4/2004 | Dubay et al. | | 70/186 |
| 2005/0138977 A1* | 6/2005 | Suzuki et al. | | 70/186 |
| 2005/0223761 A1* | 10/2005 | Okuno et al. | | 70/186 |
| 2006/0021398 A1* | 2/2006 | Hasegawa et al. | | 70/186 |
| 2006/0081023 A1* | 4/2006 | Tanimoto | | 70/186 |
| 2006/0169009 A1* | 8/2006 | Niedrig | | 70/186 |
| 2006/0288746 A1* | 12/2006 | Wise et al. | | 70/186 |
| 2008/0178643 A1* | 7/2008 | Okuno et al. | | 70/184 |
| 2009/0133452 A1* | 5/2009 | Hirche et al. | | 70/183 |
| 2009/0199604 A1* | 8/2009 | Kim | | 70/252 |

* cited by examiner

*Primary Examiner* — Lloyd Gall

(57) ABSTRACT

An anti-theft locking device for a vehicle steering wheel includes, specially an anti-theft locking device locking the steering column (10) so that it cannot rotate when it is arranged on the rotation shaft (15) of the steering column (10). The anti-theft locking device includes a limit unit (30) and a locking unit (40). The locking unit (40) may be actuated by a driving unit (50). After affirming the signal is correct through electrical detection, the driving unit (50) makes the locking unit (40) be selectively locked or disengaged relative to the limit unit (30).

3 Claims, 9 Drawing Sheets

ANTI-THEFT LOCKING DEVICE FOR A VEHICLE STEERING WHEEL

BACKGROUND OF THE INVENTION

1. Field of Invention

The invention relates to anti-theft locking devices for vehicles and more particularly to an anti-theft locking device for a vehicle steering wheel with improved characteristics.

2. Description of Related Art

Thieves steal vehicles for various purposes. Some of the thieves drive stolen vehicles for fun. Some others drive stolen vehicles for worse crimes. Some others sell stolen vehicles. Some others dismantle stolen vehicles and sell the parts. Some others extort ransom from vehicle owners. A lot of thieves steal a lot of vehicles. To stop thieves, a lot of anti-theft locking devices have been devised.

There have been crane-shaped locks, gear stick locks and steering wheel locks in early days. However, none of these locks has enjoyed a long term of success. For example, a steering wheel can be released by picking a steering wheel lock. Alternatively, the steering wheel can be cut from a steering column. The steering column can be clamped and maneuvered by a tool. The tool can be maneuvered to rotate the steering column and therefore steer a vehicle.

Engine code locks, GPS devices, and chip locks (e.g., RFID type locks) are becoming popular nowadays. They are, however, expensive. Moreover, none of them has enjoyed a long term of success. Each of these anti-theft locking devices or locks is integrated with a steering wheel. The anti-theft locking device is used to allow the rotation of the steering wheel relative to the steering column. Thus, a thief can maneuver the steering wheel but cannot maneuver the steering column.

The invention is therefore intended to obviate or at least alleviate the problems encountered in prior art.

SUMMARY OF THE INVENTION

It is therefore one object of the invention to provide an anti-theft locking device for a vehicle steering wheel, the anti-theft locking device being capable of locking the steering column after stopping but prior to parking.

To achieve the above and other objects, the invention provides an anti-theft locking device for a steering column having a rotation shaft operatively connected to a car lock and a universal joint respectively, comprising a limit unit affixed to the steering column; a locking unit affixed to the steering column and comprising a lock member; and a driving unit affixed to the steering column and comprising a drive member operatively connected to the lock member, wherein in response to locking the car lock, the drive member is adapted to move the lock member in a first direction to engage with the limit unit for locking the steering column; or in response to unlocking the car lock, the drive member is adapted to move the lock member in a second direction opposing the first direction to disengage from the limit unit for unlocking the steering column.

By utilizing the invention, five advantages can be obtained as follows.

1) The limit unit comprises a ring plate including a plurality of longitudinal apertures spaced around, and wherein the locking unit further comprises a hollow guide affixed to the steering column, the guide being disposed above the ring plate and adapted to register with one of the apertures, the guide having a longitudinal slot, a lock element moveably disposed in the guide, the lock element having a laterally projecting neck and a nut at one end of the neck, and a peg extending downward from the bottom of the lock element.

2) The locking unit further comprises a hollow guide, the guide including an opening, wherein the lock member is slidably disposed in the guide and comprises teeth having a portion facing the opening, and wherein the driving unit further comprises a pinion rotatably connected to the drive member, the pinion being engaged with the teeth, and a housing with the drive member mounted therein, the housing being disposed on the guide and affixed to the steering column.

3) The limit unit comprises a collar including a plurality of spaced parallel grooves on an outer surface, and wherein the lock member comprises a lock section at one end, the lock section being adapted to move into the groove for locking or disengage from the groove for unlocking.

4) Further comprises a plurality of means including password identification and biometric identifications including fingerprint identification, pupil identification, and voice recognition for activating the driving unit.

5) The drive member is one of a servo motor, a servo motor with a reduction gear, a motor, or a motor with a reduction gear.

The above and other objects, features and advantages of the invention will become apparent from the following detailed description taken with the accompanying drawings.

DETAILED DESCRIPTION OF THE INVENTION

Figure 1:
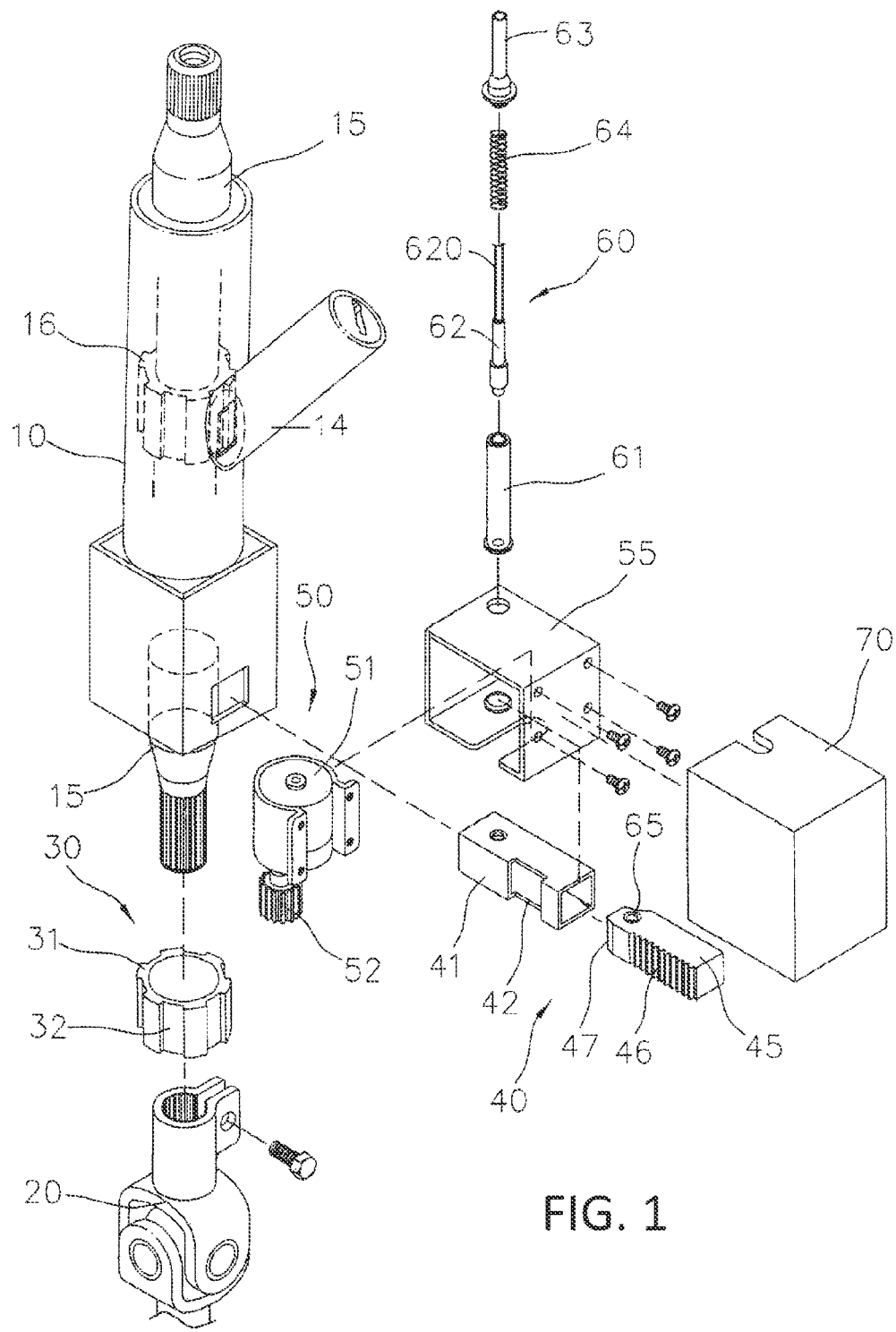
FIG. 1 is an exploded view of an anti-theft locking device for a vehicle steering wheel according to a first preferred embodiment of the invention.
Figure 2:
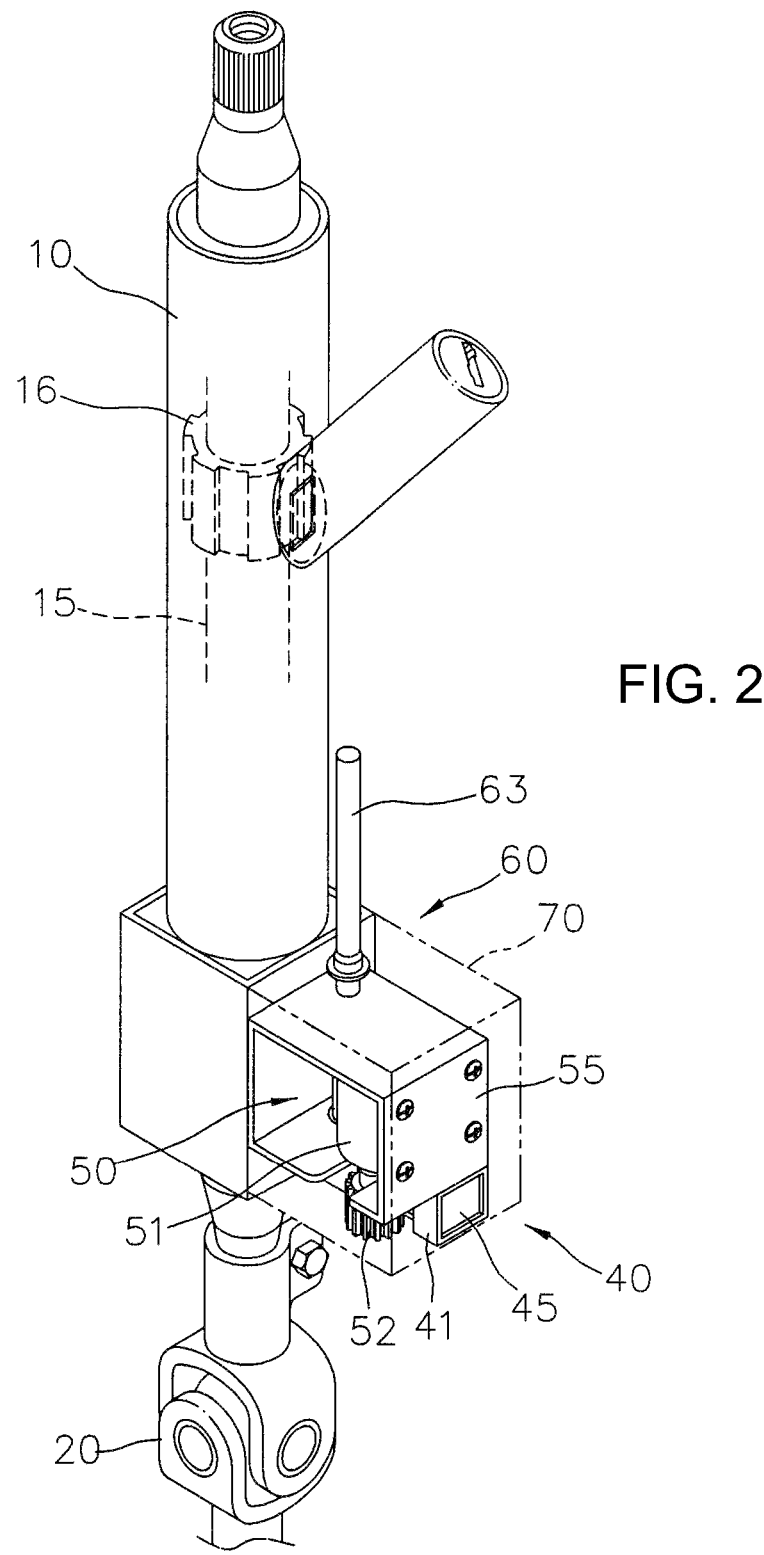
FIG. 2 is a perspective view of the assembled anti-theft locking device.

Referring to FIGS. 1 and 2, an anti-theft locking device for a vehicle steering wheel in accordance with the invention is shown. The anti-theft locking device is mounted in a steering column 10 which has a rotation shaft 15 obliquely extending upward to rotatably connect to a steering wheel (not shown) at an upper end. A lower end of the rotation shaft 15 is secured to a universal joint 20. The anti-theft locking device is mounted on the steering column 10 proximate to the universal joint 20.

Figure 3:
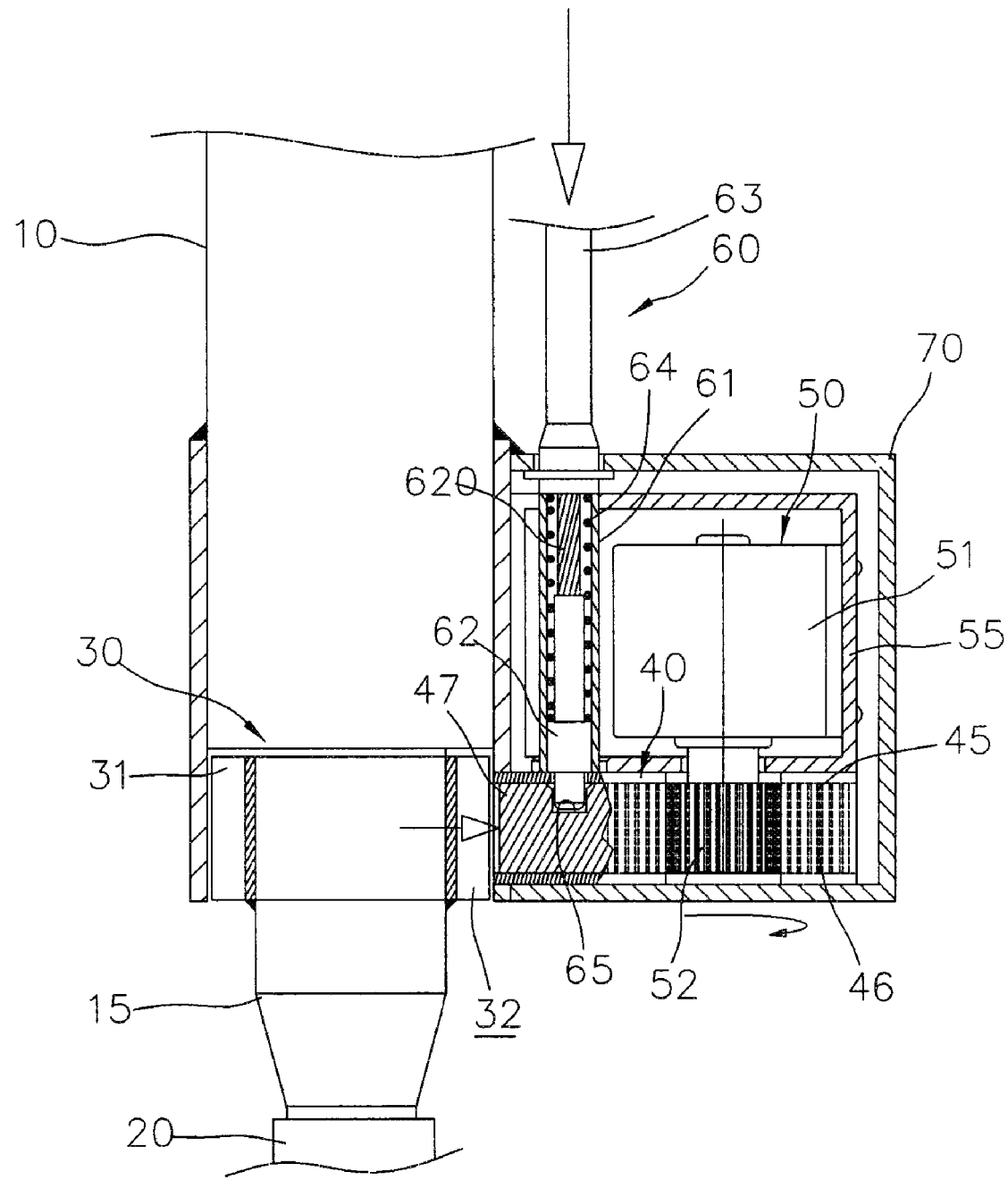
FIG. 3 is a cross-sectional view of an intermediate portion of the anti-theft locking device of FIG. 2 in an unlocked state.
Figure 4:
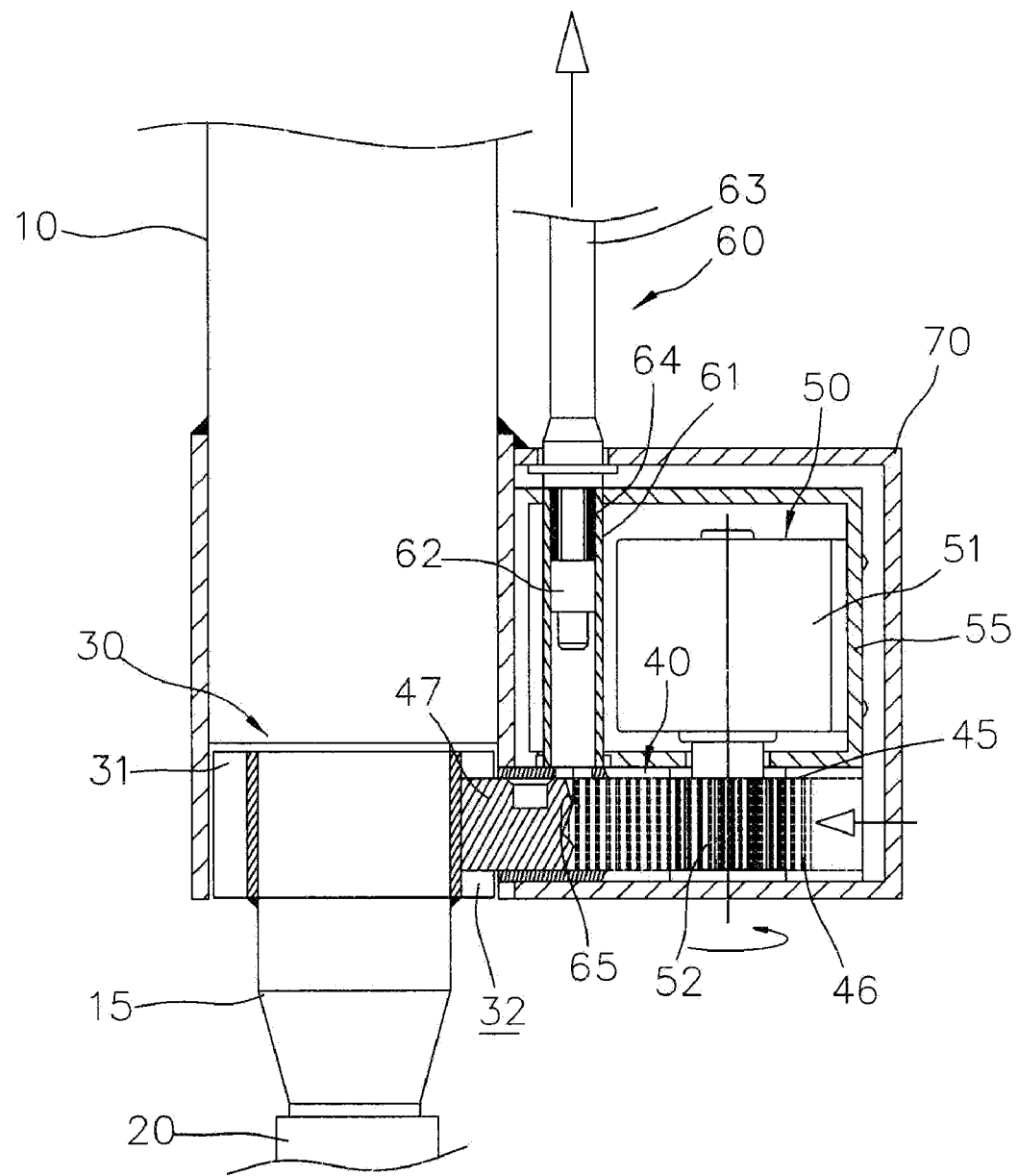
FIG. 4 is a view similar to FIG. 3 showing the anti-theft locking device in a locked state.

Referring to FIGS. 1, 2 and 3, the anti-theft locking device comprises a limit unit 30, a locking unit 40, a driving unit 50, and an actuation unit 60. The limit unit 30 is provided on a lower portion the rotation shaft 15. The locking unit 40 can be actuated by the driving unit 50 to either lock the limit unit 30 for anti-theft or unlock same for driving a motor vehicle.

The limit unit 30 is mounted on the steering column proximate to the end of the rotation shaft 15 connecting to the universal joint 20. The limit unit 30 is implemented as a collar 31 having a plurality of spaced parallel grooves 32 on an outer surface. The collar 31 can co-rotate with a collar member 16 in the steering column 10. The collar member 16 is provided on the rotation shaft 15 in the steering column 10. The collar member 16 can be turned by turning a car key inserted into a keyhole. As a result, the collar 31 turns.

The locking unit 40 comprises a hollow guide 41 of rectangular section, a rectangular opening 42 on one side of the guide 41, a lock rack 45 slidably provided in the guide 41, the lock rack 45 including teeth 46 on one side and a lock section 47 at one end, the lock section 47 being adapted to move into the groove 32 or not.

The driving unit 50 is electrically connected to an access control system (not shown) of the car and can be actuated by the access control system. The driving unit 50 comprises a battery powered drive member (e.g., servo motor, servo motor with a reduction gear, motor, or motor with a reduction gear) 51, a parallelepiped housing 55 with the drive member 51 mounted therein, the housing 55 being provided on top of the guide 41 and affixed to the steering column 10, and a pinion 52 rotatably connected to a driving shaft of the drive member 51, the pinion 52 engaging the teeth 46 and being disposed under the housing 55.

The actuation unit 60 comprises a guide pipe 61 mounted between top and bottom of the housing 55, a lock pin 62 provided in the guide pipe 61 and having a cable 620 extending upward, a helical spring 64 provided in the guide pipe 61 and put on portions of the lock pin 62 and the cable 620, a sleeve 63 put on a portion of the cable 620 externally of the housing 55, and a locking hole 65 on top of the lock section 47. The cable 620 is connected to a hand brake of an automobile. The lock rack 45 is either held motionless when the bottom end of the lock pin 62 enters the locking hole 65 or allowed to move when the lock pin 62 clears the locking hole 65 by pulling the cable 620.

A protective cover 70 is provided to house the locking unit 40, the driving unit 50, and all components of the actuation unit 60 except the sleeve 63.

Referring to FIGS. 1, 2, 3 and 4, operations of the invention are described in detail below. A driver may remove a car key from the car lock 14 to lock the engine after stopping. Next, the driver may clockwise pivot a hand brake for parking. The lock pin 62 is thus pulled upward to clear the locking hole 65 with the spring 64 being compressed as a result of the pulling of the cable 620 which is connected to the hand brake. After the lock pin 62 has cleared the locking hole 65, the driver may counterclockwise turn the car key in the car lock 14 (i.e., locked) activate the driving unit 50 by activating the access control system of the car for identification. Alternatively, the driver may operate one of a plurality of biometric identifications including fingerprint identification, and voice recognition to activate the driving unit 50 by activating the access control system of the car for identification. And in turn (i.e., the identification is true) (see FIG. 4), the drive member 51 is activated to counterclockwise rotate the pinion 52 which in turn moves the lock rack 45 leftward due to meshing with the teeth 46. The movement of the lock rack 45 will be stopped when the lock section 47 fully engages with the groove 32. As a result, the steering column 10 is locked.

For driving the car, the driver may insert the car key in the car lock 14 and turn the same clockwise (i.e., unlocked) to activate the driving unit 50 by activating the access control system for identification. Alternatively, the driver may operate one of the above biometric identifications to activate the driving unit 50 by activating the access control system for identification. And in turn (i.e., the identification is true) (see FIG. 3), the drive member 51 is activated to clockwise rotate the pinion 52 which in turn moves the lock rack 45 rightward due to meshing with the teeth 46. The movement of the lock rack 45 will be stopped when the lock section 47 fully disengages from the groove 32 after a predetermined period of time (e.g., a number of seconds). As a result, the steering column 10 is unlocked. Thereafter, the driver may counterclockwise pivot the hand brake (i.e., release the hand brake). The lock pin 62 is thus pulled downward to enter the locking hole 65 due to the expansion of the spring 64 and the loosening of the cable 620. As a result, the lock rack 45 is kept motionless (i.e., locked). Note that the above operations are equally applicable to motorcycles.

Figure 5:
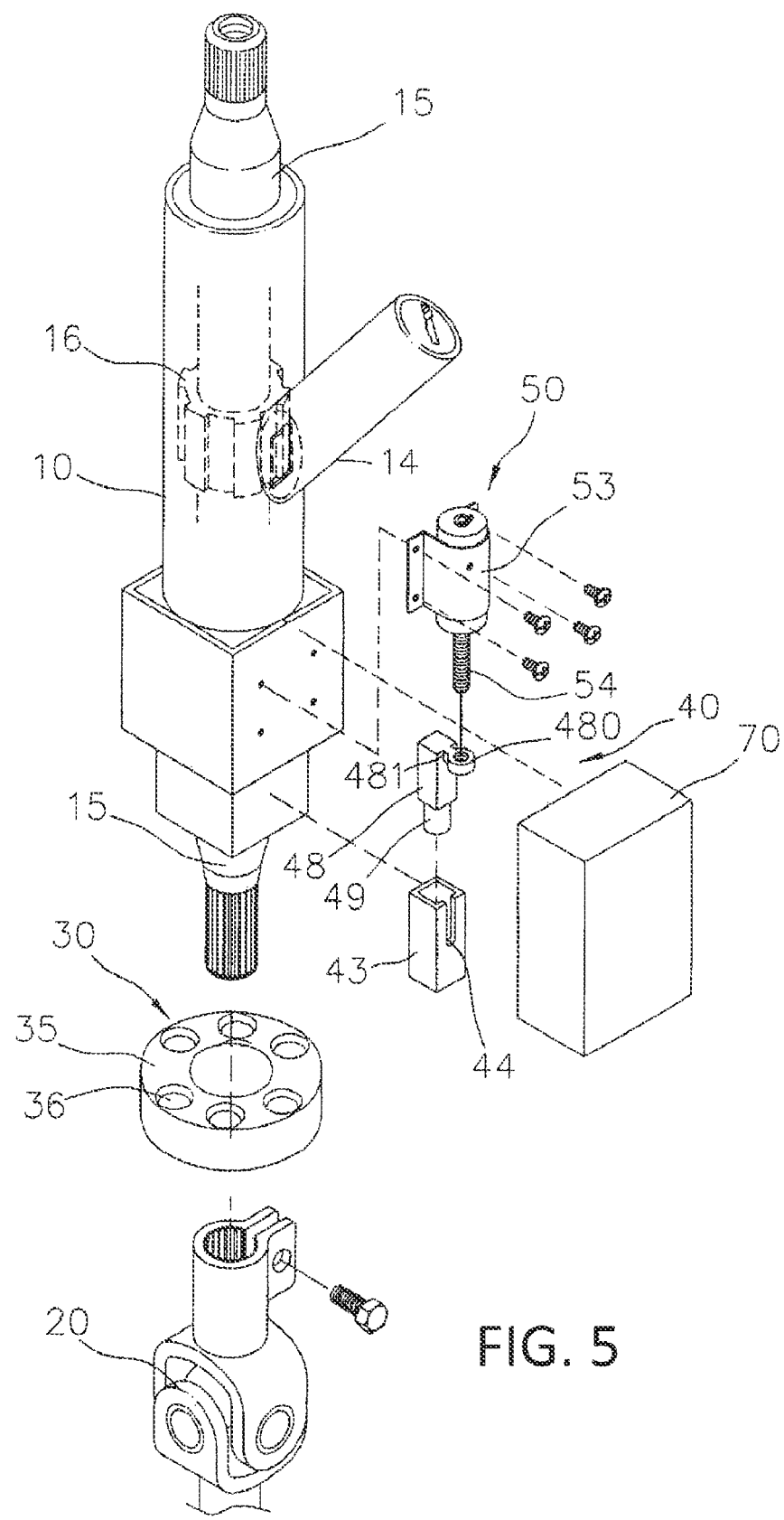
FIG. 5 is an exploded view of an anti-theft locking device for a vehicle steering wheel according to a second preferred embodiment of the invention.
Figure 6:
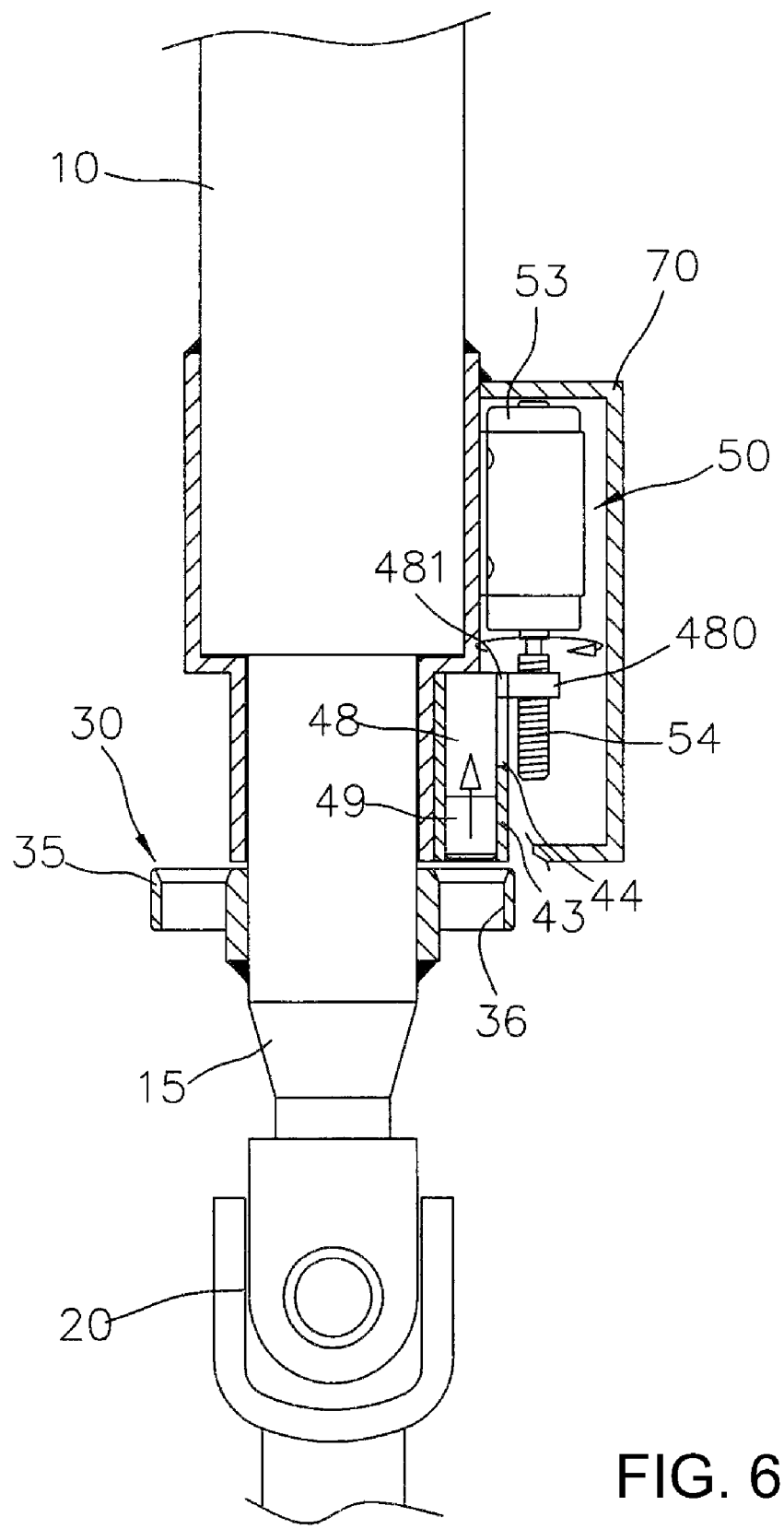
FIG. 6 is a cross-sectional view of an intermediate portion of the assembled anti-theft locking device of FIG. 5 in an unlocked state.
Figure 7:
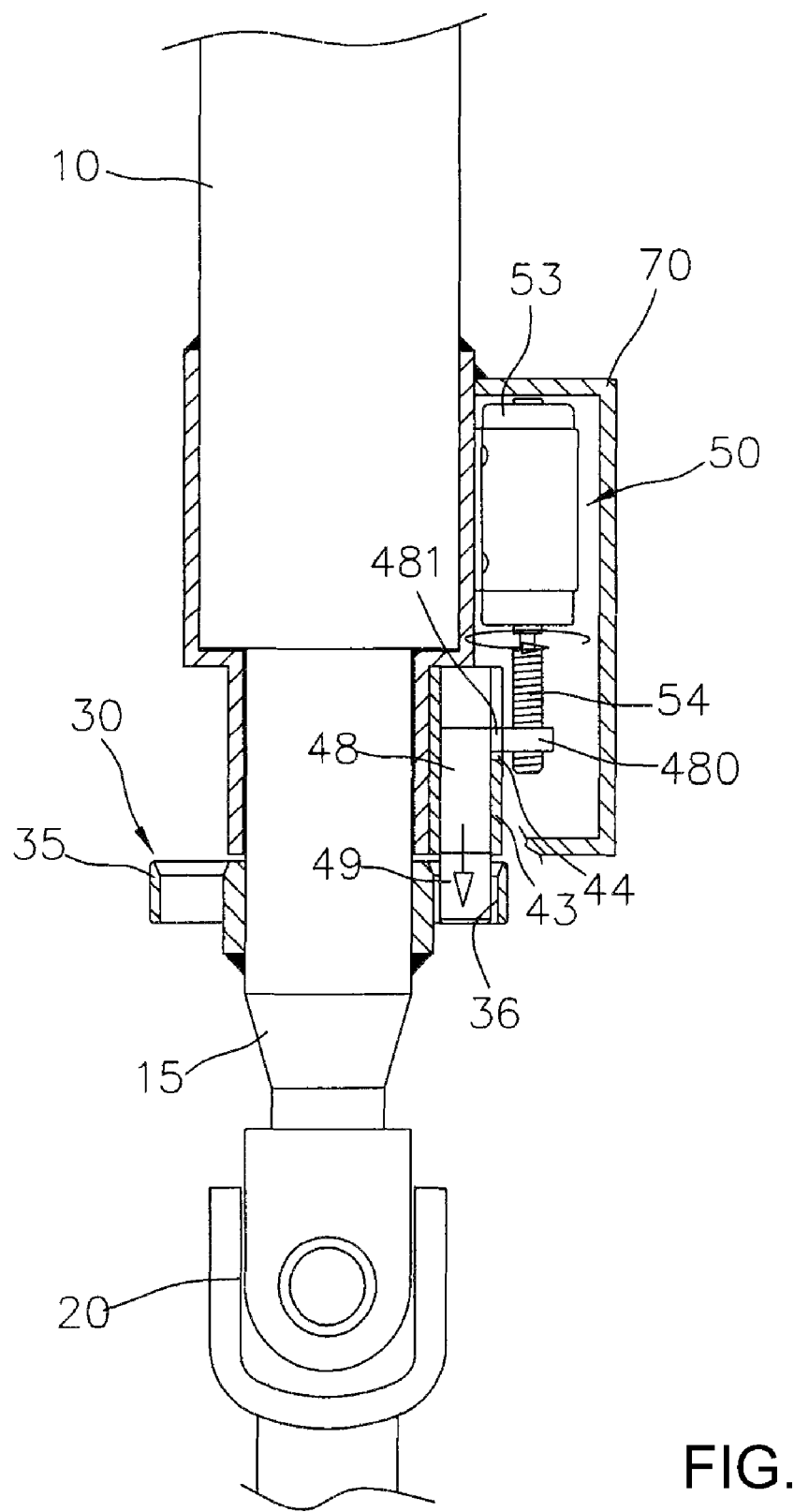
FIG. 7 is a view similar to FIG. 6 showing the anti-theft locking device in a locked state.

Referring to FIGS. 5, 6 and 7, an anti-theft locking device for a vehicle steering wheel in accordance with a second preferred embodiment of the invention is shown. The second embodiment is substantially the same as the first embodiment except the followings: The limit unit 30 is implemented as a ring plate 35 including a plurality of longitudinal apertures 36 spaced around. The apertures 36, functioning similar to the grooves of the first preferred embodiment, correspond to the collar member 16 and are adapted to co-rotate therewith. The locking unit 40 comprises a hollow guide 43 affixed to the steering column 10. The guide 43 is provided above the ring plate 35 and is adapted to register with one of the apertures 36. The guide 43 has a longitudinal slot 44 on one surface. The locking unit 40 further comprises a lock member 48 moveably provided in the guide 43, the lock member 48 having a laterally projecting neck 481 and a nut 480 at one end of the neck 481, and a cylindrical peg 49 extending downward from the bottom of the lock member 48. The driving unit 50 is affixed to the steering column 10 and comprises a battery powered drive member (e.g., servo motor, servo motor with a reduction gear, motor, or motor with a reduction gear) 53 and a threaded driving shaft 54 driven through the nut 480. A protective cover 70 is affixed to the steering column 10 for housing the locking unit 40 and the driving unit 50.

Operations of the invention are described in detail below. A driver may counterclockwise turn the car key in the car lock 14 (i.e., locked) to activate the driving unit 50 by activating the access control system for identification. Alternatively, the driver may operate one of biometric identifications to activate the driving unit 50 by activating the access control system for identification. And in turn (i.e., the identification is true) (see FIG. 7), the drive member 53 is activated to counterclockwise rotate the driving shaft 54 which in turn moves the nut 480 downward by threading. The peg 49 thus moves into one of the apertures 36 for lock. The movement of the peg 49 will be stopped when the neck 481 contacts the bottom end of the slot 44. As a result, the steering column 10 is locked. For driving the car, the driver may insert the car key in the car lock 14 and turn the same clockwise (i.e., unlocked) to activate the driving unit 50 by activating the access control system for identification. Alternatively, the driver may operate one of the above biometric identifications to activate the driving unit 50 by activating the access control system for identification. And in turn (i.e., the identification is true) (see FIG. 6), the drive member 53 is activated to clockwise rotate the driving shaft 54 which in turn moves the nut 480 upward by threading. The peg 49 thus clears the aperture 36. The movement of the peg 49 will be stopped when the lock member 48 contacts the steering column 10. As a result, the steering column 10 is unlocked.

Figure 8:
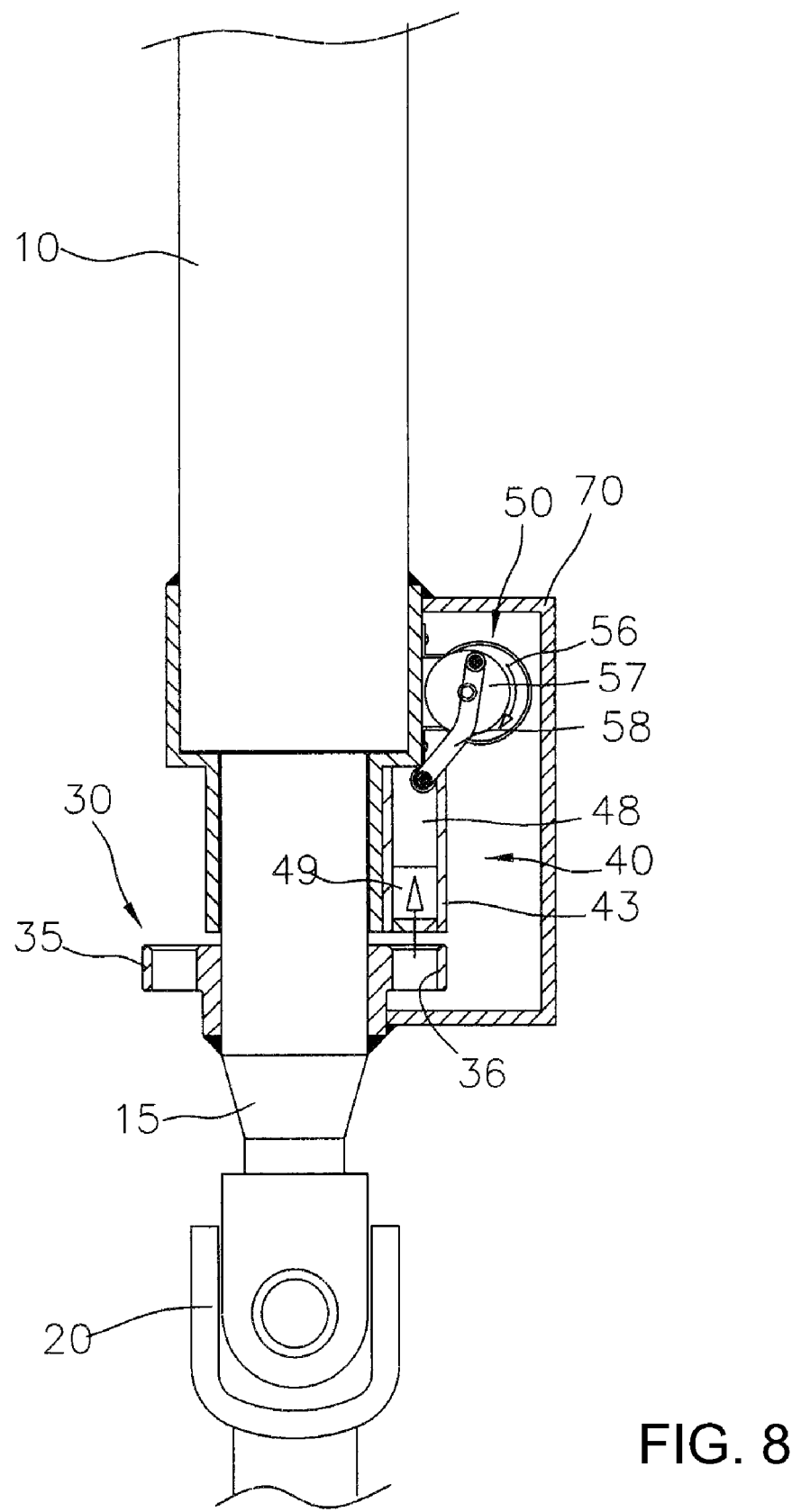
FIG. 8 is a cross-sectional view of an anti-theft locking device for a vehicle steering wheel according to a third preferred embodiment of the invention in an unlocked state.
Figure 9:
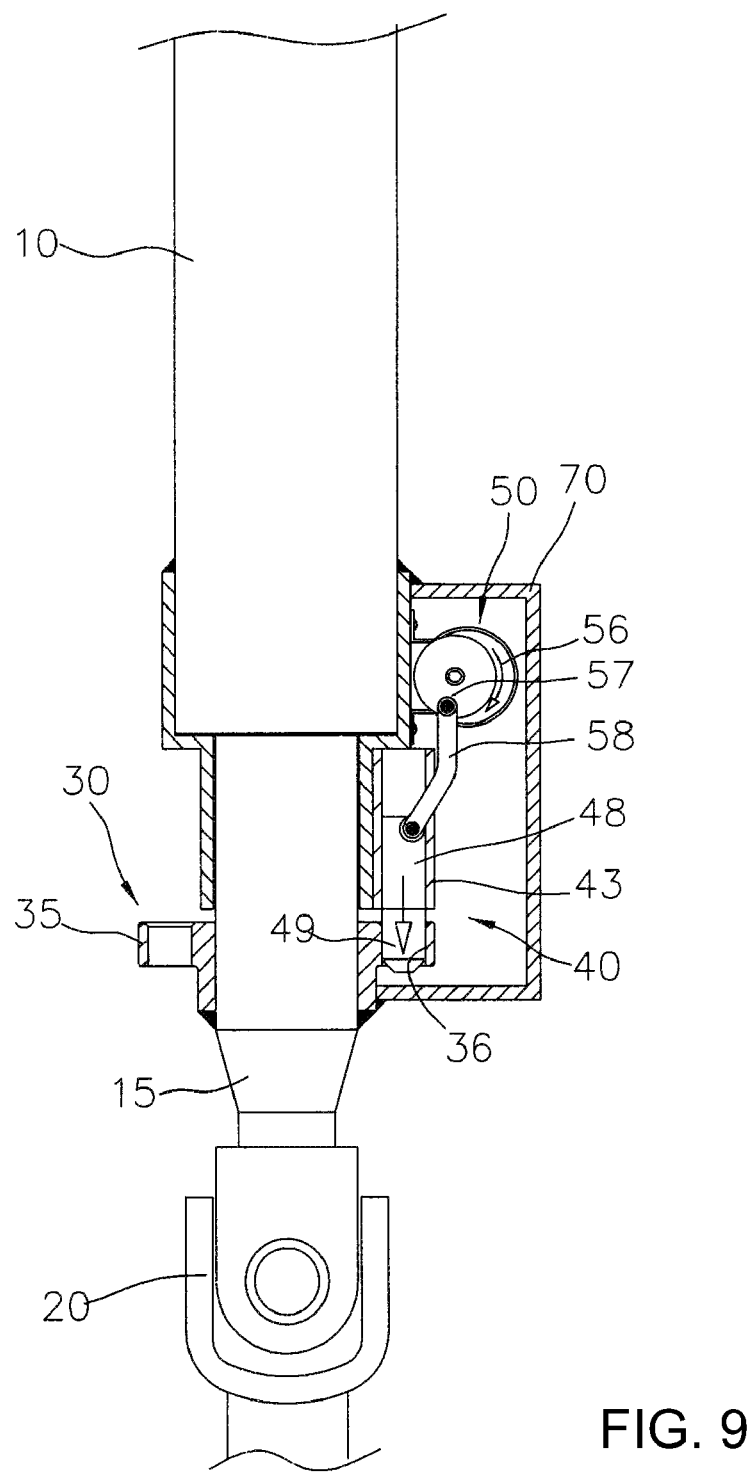
FIG. 9 is a view similar to FIG. 8 showing the anti-theft locking device in a locked state.

Referring to FIGS. 8 and 9, an anti-theft locking device for a vehicle steering wheel in accordance with a third preferred embodiment of the invention is shown. The third embodiment is substantially the same as the second embodiment except the followings: The locking unit 40 comprises a hollow guide 43 affixed to the steering column 10. The guide 43 is provided above the ring plate 35 and is adapted to register with one of the apertures 36. The guide 43 has a longitudinal slot (not shown) on one surface. The locking unit 40 further comprises a lock member 48 moveably provided in the guide 43, and a cylindrical peg 49 extending downward from the bottom of the lock member 48. The driving unit 50 comprises a battery powered drive member (e.g., servo motor, servo motor with a reduction gear, motor, or motor with a reduction gear) 56, a crankshaft 58 connected to the driving shaft of the drive member 56, and a flywheel 57 connected to the crankshaft 58. The crankshaft 58 has the other end connected to the top of the lock member 48.

Operations of the invention are described in detail below. A driver may counterclockwise turn the car key in the car lock (i.e., locked) to activate the driving unit 50 by activating the access control system for identification. Alternatively, the driver may operate one of the above biometric identifications to activate the driving unit 50 by activating the access control system for identification. And in turn (i.e., the identification is true) (see FIG. 9), the drive member 56 is activated to clockwise rotate both the crankshaft 58 and the flywheel 57 about 180 degrees. The peg 49 thus moves into one of the apertures 36 for lock. As a result, the steering column 10 is locked. For driving the car, the driver may insert the car key in the car lock and turn the same clockwise (i.e., unlocked) to activate the driving unit 50 by activating the access control system for identification. Alternatively, the driver may operate one of the above biometric identifications to activate the driving unit 50 by activating the access control system for identification. And in turn (i.e., the identification is true) (see FIG. 8), the drive member 56 is activated to clockwise rotate both the crankshaft 58 and the flywheel 57 about another 180 degrees. The peg 49 thus clears the aperture 36. As a result, the steering column 10 is unlocked.

While the invention has been described in terms of preferred embodiments, those skilled in the art will recognize that the invention can be practiced with modifications within the spirit and scope of the appended claims.

What is claimed is:

1. An anti-theft locking device for a vehicle including a steering column (10) having a rotation shaft (15) operatively connected to a lock (14) and a universal joint (20) respectively, comprising:
   a limit unit (30) affixed onto the rotation shaft (15) and comprising a ring plate (35) including a plurality of longitudinal apertures (36) spaced around;
   a locking unit (40) comprising a hollow guide (43) affixed to the steering column (10), the guide (43) being disposed above the ring plate (35) and adapted to register with a respective one of the apertures (36), the guide (43) having a longitudinal slot (44), a lock element (48) moveably disposed in the guide (43), the lock element (48) having a laterally projecting neck (481) and a nut (480) at one end of the neck (481), and a peg (49) extending downward from a bottom of the lock element (48); and
   a driving unit (50) affixed to the steering column (10) and comprising a battery powered drive member (53) and a threaded driving shaft (54) driven through the nut (480) so that a rotation of the driving shaft (54) moves the nut (480) either downward to move the peg (49) into a respective one of the apertures (36) for locking or upward to disengage the peg (49) from the aperture (36) for unlocking,
   whereby locking the lock (14) and activating the drive member (53) will counterclockwise rotate the driving shaft (54) which in turn moves the nut (480) downward and moves the peg (49) into a respective one of the apertures (36) wherein the neck (481) contacting a bottom end of the slot (44) stops the movement of the peg (49) to lock the steering column (10); and
   whereby activating the driving unit (50) will actuate the drive member (53) to clockwise rotate the driving shaft (54) which in turn moves the nut (480) upward and causes the peg (49) to clear the aperture (36) wherein the lock member (48) contacting the steering column (10) stops the movement of the peg (49) to unlock the steering column (10).

2. An anti-theft locking device for a vehicle including a steering column (10) having a rotation shaft (15) operatively connected to a lock (14) and a universal joint (20) respectively, comprising:
   a limit unit (30) affixed onto the rotation shaft (15) and comprising a ring plate (35) including a plurality of longitudinal apertures (36) spaced around;
   a locking unit (40) comprising a hollow guide (43) affixed to the steering column (10), the guide (43) being disposed above the ring plate (35) and adapted to register with a respective one of the apertures (36), a lock element (48) moveably disposed in the guide (43), and a peg (49) extending downward from a bottom of the lock element (48); and
   a driving unit (50) affixed to the steering column (10) and comprising a battery powered drive member (56), a crankshaft (58) connected to the drive member (56), and a flywheel (57) connected to the crankshaft (58),
   whereby locking the lock (14) and activating the drive member (56) will clockwise rotate both the crankshaft (58) and the flywheel (57) about 180 degrees to move the peg (49) into a respective one of the apertures (36) to lock the steering column (10); and
   whereby activating the driving unit (50) will actuate the drive member (56) to clockwise rotate both the crankshaft (58) and the flywheel (57) about another 180 degrees to disengage the peg (49) from the aperture (36) to unlock the steering column (10).

3. An anti-theft locking device for a vehicle including a steering column (10) having a rotation shaft (15) operatively connected to a lock (14) and a universal joint (20) respectively, comprising:
   a limit unit (30) affixed onto the rotation shaft (15) and comprising a plurality of spaced parallel grooves (32) on an outer surface;
   a locking unit (40) affixed to the steering column (10) and comprising a hollow guide (41) including an opening (42), a lock member (45) slidably disposed in the guide (41) and including teeth (46) partially facing the opening (42) and a lock section (47) at one end;
   a driving unit (50) comprising a housing (55) disposed on top of the guide (41) and affixed to the steering column (10), a battery powered drive member (51) mounted in the housing (55), and a pinion (52) disposed externally of the housing (55), the pinion (52) rotatably connected to the drive member (51) and engaged with the teeth (46); and
   an actuation unit (60) comprising a locking hole (65) on the lock member (45) and a spring biased lock pin (62)

inserted through the housing (55) into the locking hole (65) and having a cable (620) extending therefrom, whereby locking the lock (14) and pulling the cable (620) will pull the lock pin (62) to clear the locking hole (65), and activating the driving unit (50) will activate the drive member (51) to counterclockwise rotate the pinion (52) which in turn moves the lock member (45) wherein the movement of the lock member (45) stops when the lock section (47) fully engages with the groove (32) to lock the steering column (10); and whereby activating the driving unit (50) to actuate the drive member (51) will clockwise rotate the pinion (52) which in turn moves the lock member (45) wherein the movement of the lock member (45) stops when the lock section (47) fully disengages from the groove (32) to unlock the steering column (10), and releasing the cable (620) will push the lock pin (62) into the locking hole (65).

\* \* \* \* \*